Aug. 28, 1923.

J. BUCHLI 1,466,013

ELECTRODE STEAM BOILER

Filed June 2, 1921

Inventor
J. Buchli
By Marks & Clerk
Attys.

Patented Aug. 28, 1923.

1,466,013

UNITED STATES PATENT OFFICE.

JACOB BUCHLI, OF BADEN, SWITZERLAND, ASSIGNOR TO AKTIENGESELLSCHAFT BROWN, BOVERI & CIE., OF BADEN, SWITZERLAND.

ELECTRODE STEAM BOILER.

Application filed June 2, 1921. Serial No. 474,326.

*To all whom it may concern:*

Be it known that I, JACOB BUCHLI, a citizen of the Swiss Republic, residing at No. 2 Felsenstrasse, Baden, Switzerland, have invented certain new and useful Improvements in Electrode Steam Boilers, of which the following is a specification.

In electrode steam boilers with electric heating, the output of the boiler is limited by the current density at the electrodes. The surface area of the electrode is considerably diminished by bubbles of steam that form on the electrodes so that the current density is very great at certain points. Sparking occurs; the electrode becomes very hot; current and output become quite irregular and uncontrollable, and the sparking gives rise to decomposition of the water. In order to prevent this, according to this invention, a current of water is passed for each electrode whereby the latter is constantly "washed" so that on the one hand its own temperature cannot rise very much higher than that of the boiler water, and on the other hand any bubbles of steam that are formed will be carried away by the stream of water.

Figure 1:
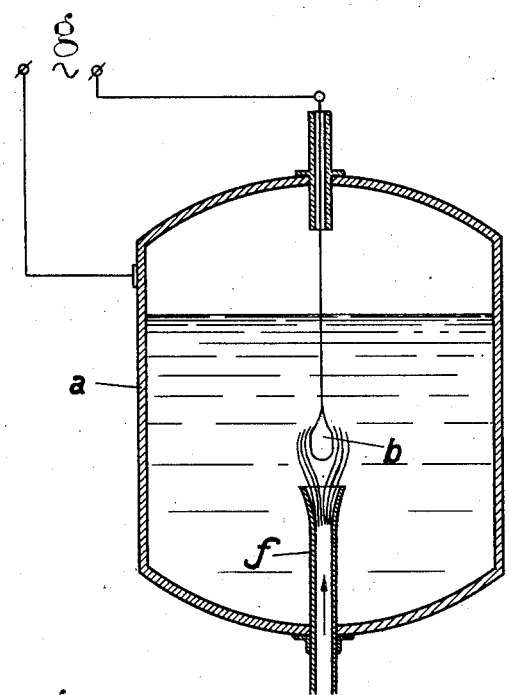
Figure 1 represents diagrammatically a simple case of an electrode steam boiler according to the invention.
Figure 2:
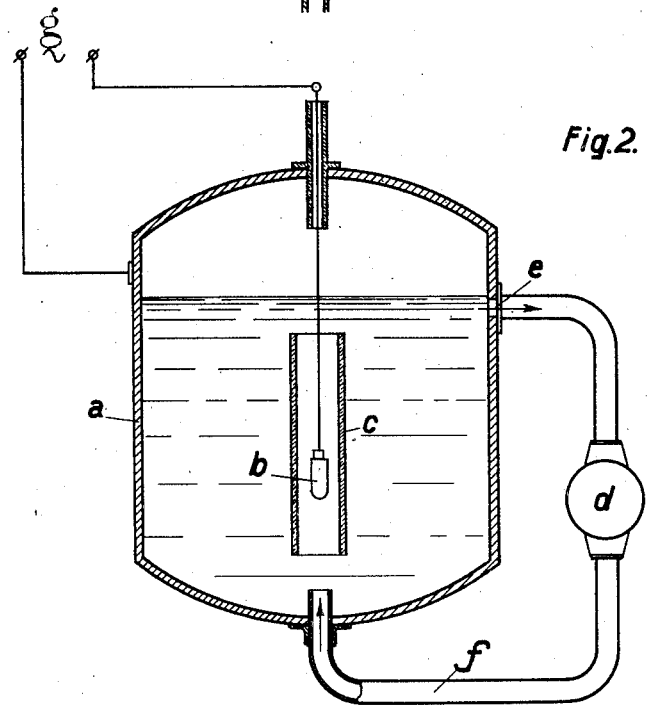
Figure 2 represents diagrammatically a modification of Figure 1 with a pump for circulating the boiler water and an insulating tube surrounding the electrode.

The essential nature of this invention is illustrated in Fig. 1 of the accompanying drawings, wherein $a$ is the steam boiler, $b$ is the electrode. $g$ represents diagrammatically a source of electrical power whose poles are connected to the boiler shell and the electrode respectively. Just underneath the electrode there opens a pipe $f$ through which a strong stream of water, entering from outside, is directed against the electrode $b$. In the case of high voltage it is not possible to use an uncovered electrode. Consequently, as shown in Fig. 2, the electrode is surrounded by an insulating tube $c$ which opens just below the surface of the water and serves also as a guide for the cooling water issuing from the pipe $f$. The cooling water is shown, but only by way of example, as being drawn from the boiler water at $e$, and returned to the boiler through the pipe $f$ by means of the circulating pump $d$, so that there is a continuous circulation of boiler water through the tube $c$. By this means the electrode is cooled and bubbles of steam forming on it are carried away. Further, the entire contents of the boiler are heated uniformly and the insulating tube is less subject to local electrolytic corrosion. The direction of the stream of water follows that of the natural circulation of the water in the boiler, the electrode $b$ being "washed" by it from the upward direction. The supply pipe $f$ should be narrower at least at its mouth than the insulating pipe $c$.

The supply pipe for the cooling water may also be utilized in a peculiar manner for regulating the tube of the steam boiler, without thereby interfering with the "washing" of the fixed electrode. This is effected as follows:

Above the portion of the pipe $f$ that is situated inside the boiler, there is arranged a short piece of conducting tube which can be slipped from the outside on to or into the pipe $f$, and which will form either an intermediate electrode, or is connected to the other pole of the electric supply circuit, or in the case of polyphase supply circuits is connected to the zero point. Then, by sliding from the outside, this piece of tube towards or away from the fixed electrode, the generation of steam can be regulated. According as this piece of tube projects beyond the fixed pipe $f$, it will constitute more or less an extension of the guidance for the cooling water. Instead of driving the stream of water against the electrode through a separate pipe, as shown in the figures, the stream of water may be passed through the actual tubular electrode which is to be cooled, in which case then a part of the water-guiding pipe must be made of insulating material.

What I claim is:—

1. An electrically heated steam generator including a boiler shell, an electrode projecting into the boiler water, a pipe projecting through the boiler shell and adapted to deliver a stream of water over the electrode in a direction substantially coincident with the direction of flow of the water due to convection for the purpose of cooling the electrode and carrying off the steam bubbles which are given off by the electrode during operation.

2. An electrically heated steam generator as claimed in claim 1, including a pump located outside the boiler adapted to deliver water to the delivery pipe.

3. An electrically heated steam generator as claimed in claim 1, including a connection between the end of the said pipe remote from the electrode and the water in the upper part of the boiler water space.

4. An electrically heated steam generator as claimed in claim 1, including a tube of insulating material surrounding the electrode and above the outlet of the water delivery pipe, said insulating tube being larger in diameter than the upper orifice of the water delivery pipe.

In testimony whereof I have signed my name to this specification.

J. BUCHLI.